(12) United States Patent
Bernhard et al.

(10) Patent No.: US 10,285,135 B2
(45) Date of Patent: May 7, 2019

(54) DATA TRANSMISSION ARRANGEMENT, DATA RECEIVER, AND METHOD FOR THE OPERATION THEREOF

(71) Applicant: Fraunhofer-Gesellschaft zur Foerderung der angewandten Forschung e.V., Munich (DE)

(72) Inventors: Josef Bernhard, Nabburg (DE); Gerd Kilian, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 86 days.

(21) Appl. No.: 15/245,413

(22) Filed: Aug. 24, 2016

(65) Prior Publication Data

US 2016/0366649 A1    Dec. 15, 2016

Related U.S. Application Data

(63) Continuation of application No. PCT/EP2015/053947, filed on Feb. 25, 2015.

(30) Foreign Application Priority Data

Feb. 26, 2014  (EP) .................................. 14156802

(51) Int. Cl.
*H04W 52/00* (2009.01)
*H04W 52/02* (2009.01)
(Continued)

(52) U.S. Cl.
CPC ....... *H04W 52/0277* (2013.01); *H04L 5/0051* (2013.01); *H04L 69/22* (2013.01); *Y02D 70/166* (2018.01); *Y02D 70/25* (2018.01)

(58) Field of Classification Search
CPC .. H04W 52/0277; H04L 69/22; H04L 5/0051; Y02D 70/166; Y02D 70/25
See application file for complete search history.

(56) References Cited

U.S. PATENT DOCUMENTS

| 8,670,494 B2 * | 3/2014 | Ko ........................ H04L 1/0057 375/260 |
| 2006/0103534 A1 | 5/2006 | Arms et al. |

(Continued)

FOREIGN PATENT DOCUMENTS

| DE | 10 2011 082 098 A1 | 3/2013 |
| EP | 0 903 883 A2 | 3/1999 |

(Continued)

OTHER PUBLICATIONS

Notification of Reasons for Refusal issued in corresponding Japanese patent application No. 2016-554215 dated Oct. 31, 2017 (and its English translation).

(Continued)

*Primary Examiner* — Phuc H Tran
(74) *Attorney, Agent, or Firm* — McClure, Qualey & Rodack, LLP

(57) ABSTRACT

A data transmission arrangement includes an energy supplier for supplying the data transmission arrangement with electrical energy; a determiner for determining useful data provided by a sensor element connected to the data transmission arrangement; a coder for channel coding of the useful data so as to obtain channel-coded data; a splitter for splitting up the channel-coded data into a plurality of data packets having a code rate smaller than one; and a transmitter for transmitting data packets which is configured to transmit the plurality of data packets via a communication channel with a time lag, provided that an amount of electrical energy that can be provided by the energy supplier is (Continued)

sufficient for transmitting the respective data packets at a standard transmitting power.

16 Claims, 8 Drawing Sheets

(51) Int. Cl.
*H04L 5/00* (2006.01)
*H04L 29/06* (2006.01)

(56) References Cited

U.S. PATENT DOCUMENTS

| | | |
|---|---|---|
| 2006/0119344 A1 | 6/2006 | Benke et al. |
| 2010/0251038 A1 | 9/2010 | Oyama |
| 2010/0253156 A1 | 10/2010 | Iott et al. |
| 2010/0264906 A1 | 10/2010 | Shamir et al. |
| 2011/0222419 A1 | 9/2011 | Callaway, Jr. et al. |
| 2014/0112412 A1* | 4/2014 | Ko .................. H04L 5/0053 375/295 |
| 2014/0176341 A1 | 6/2014 | Bernhard et al. |

FOREIGN PATENT DOCUMENTS

| | | |
|---|---|---|
| EP | 1 420 529 A2 | 5/2004 |
| EP | 1 677 448 A2 | 7/2006 |
| JP | 2005-159532 A | 6/2005 |
| JP | 2009-159619 A | 7/2009 |
| JP | 2009231979 A | 10/2009 |
| KR | 1020110134879 A | 12/2011 |
| KR | 1020130037316 A | 4/2013 |
| WO | 2004/051872 A2 | 6/2004 |
| WO | 2009/081425 A1 | 7/2009 |
| WO | 2009/157758 A1 | 12/2009 |

OTHER PUBLICATIONS

Decision to Grant issued in corresponding Korean patent application No. 10-2016-7026612 dated May 30, 2018 (and its partial English translation).

* cited by examiner

DATA TRANSMISSION ARRANGEMENT, DATA RECEIVER, AND METHOD FOR THE OPERATION THEREOF

CROSS-REFERENCE TO RELATED APPLICATIONS

This application is a continuation of copending International Application No. PCT/EP2015/053947, filed Feb. 25, 2015, which is incorporated herein by reference in its entirety, and additionally claims priority from European Application No. EP 14156802.2, filed Feb. 26, 2014, which is incorporated herein by reference in its entirety.

Embodiments of the present invention relate to a data transmission arrangement, to a data receiver, to a system comprising a data transmission arrangement and a data receiver, as well as to methods of operating same. Further embodiments relate to a data transmission arrangement that is self-sufficient in terms of its energy supply. Some embodiments relate to a wireless transmission method for low-powered transmitters with limited energy supply.

BACKGROUND OF THE INVENTION

For transmitting small amounts of data from a large number of nodes, e.g. sensor data such as heat, electricity or water meters, for example, to a base station, a radio transmission system may be employed. In this context, the base station receives (and possibly controls) a large number of nodes. Typically, more computing power and more complex hardware, i.e. generally also a receiver with increased performance, are available at the base station. Convenient quartzes, which in most cases have frequency offsets of 10 ppm or more, are used in the nodes.

There already exist various uni-directional and bi-directional systems for transmitting data between base stations and nodes. Known systems are, e.g., DECT (Digital Enhanced Cordless Telecommunications, an international standard for telecommunications by means of radio technology) and RFID (Radio Frequency IDentification). What is typical about these systems is that the base station specifies a reference frequency and a reference time to which the subscribers synchronize. In RFID systems, the RFID reader specifies a time window which directly follows its emission and within which the RFID transponders arbitrarily choose a point in time for their reply. The specified time interval is additionally split up into time slots of equal length. This is referred to as a time slot based (slotted) Aloha protocol. In DECT, in turn, times slots are provided within a fixedly specified grid. Here, the base station allocates an exact time slot to a subscriber which said subscriber is allowed to use for communication. Due to the inaccuracy caused by the quartz tolerance, a buffer time is provided between the time slots so that the telegrams do not superimpose on one another.

DE 10 2011 082 098 A1 describes a method of operating battery-powered data transmitters, in which method a sensor data packet (telegram) is split up into at least two data packets which are smaller than the actual information to be transmitted (telegram splitting). Telegrams are split up into several data packets (partial packets). Such a data packet (partial packet) is referred to as a hop. Within a hop, several information symbols are transmitted. The hops are emitted on one frequency or are spread across several frequencies (frequency hopping). In between the hops, there are breaks during which no transmission performed.

Data transmitters may not only be battery-powered, but they may draw their energy from the environment via an energy harvesting element such as via a solar cell, from a movement or from temperature differences, for example. For example, the EnOcean® system for wireless radio-controlled switches is known.

In data transmitters which draw their energy from the environment via an energy harvesting method, e.g. via light, temperature differences or vibrations, for example, a constant supply of energy may not be possible in some circumstances. The same may also apply to data transmitters which are battery-powered but wherein only a limited amount of energy may be withdrawn per time unit.

SUMMARY

According to an embodiment, a data transmission arrangement may have: an energy supplier for supplying the data transmission arrangement with electrical energy; a determiner for determining useful data provided by a sensor element connected to the data transmission arrangement; a coder for channel coding of the useful data so as to acquire channel-coded data; a splitter for splitting up the channel-coded data into a plurality of data packets having a code rate smaller than one; and a transmitter for transmitting data packets which is configured to transmit the plurality of data packets via a communication channel with a time lag, provided that an amount of electrical energy that can be provided by the energy supplier is sufficient for transmitting the respective data packets at a standard transmitting power, so that there are non-transmission periods in between the data packets during which no transmission is performed; the energy supplier having an energy harvesting element for non-line-conducted energy extraction from the environment of the data transmission arrangement; the energy supplier having an energy store for storing the energy extracted by the energy harvesting element, the energy store being configured for short, pulse-like load; the transmitter for transmitting data packets being configured to select the time lag with which the data packets are transmitted such that the energy store of the energy supplier is subjected to a short, pulse-like load; the transmitter for transmitting data packets being configured to either transmit a data packet, which is about to be transmitted, of the plurality of data packets at a reduced transmitting power if an amount of electrical energy that can be provided by the energy supplier is sufficient for transmitting the respective data packet at the reduced transmitting power, the reduced transmitting power being reduced by a maximum of 40 dB as compared to the standard transmitting power; or not transmit or to transmit with delay a data packet, which is about to be transmitted, of the plurality of data packets if an amount of electrical energy that can be provided by the energy supplier is not sufficient for transmitting the respective data packet.

According to another embodiment, a data receiver may have: a receiver for receiving data packets, the data packets each having a code rate smaller than one and being transmitted via a communication channel with a time lag, so that there are non-transmission periods in between the data packets during which no transmission is performed, the receiver for receiving data packets being configured to determine the data packets within a receive data stream; the receiver for receiving data packets being configured to measure a receive power of the receive data stream during reception of the respective data packets and during the non-transmission periods prior to reception of the respective data packets and/or following reception of the respective data packets, so as to determine a change in the receive power of the receive data stream; the receiver for receiving data packets being configured to weight, for further processing, each of the data packets on the basis of the determined change in the receive power so as to acquire received data packets; processor for further processing the received data packets, configured to perform channel decoding of the received data packets which is dependent on the weighting of the received data packets, so as to acquire useful data contained within the data packets.

According to another embodiment, a system may have: an inventive data transmission arrangement; and a data receiver which may have: a receiver for receiving data packets, the data packets each having a code rate smaller than one and being transmitted via a communication channel with a time lag, so that there are non-transmission periods in between the data packets during which no transmission is performed, the receiver for receiving data packets being configured to determine the data packets within a receive data stream; the receiver for receiving data packets being configured to measure a receive power of the receive data stream during reception of the respective data packets and during the non-transmission periods prior to reception of the respective data packets and/or following reception of the respective data packets, so as to determine a change in the receive power of the receive data stream; the receiver for receiving data packets being configured to weight, for further processing, each of the data packets on the basis of the determined change in the receive power so as to acquire received data packets; processor for further processing the received data packets, configured to perform channel decoding of the received data packets which is dependent on the weighting of the received data packets, so as to acquire useful data contained within the data packets.

According to another embodiment, a method of operating a data transmission arrangement, which data transmission arrangement may have: an energy supplier for supplying the data transmission arrangement with electrical energy, the energy supplier having an energy harvesting element for non-line-conducted energy extraction from the environment of the data transmission arrangement, the energy supplier having an energy store for storing the energy extracted by the energy harvesting element, the energy store being configured for short, pulse-like load, may have the steps of: determining useful data provided by a sensor element connected to the data transmission arrangement; channel coding of the useful data so as to acquire channel-coded data; splitting up the channel-coded data into a plurality of data packets having a code rate smaller than one; transmitting the plurality of data packets via a communication channel with a time lag, so that there are non-transmission periods in between the data packets during which no transmission is performed, provided that an amount of electrical energy that can be provided by the energy supplier is sufficient for transmitting the respective data packets at a standard transmitting power; said transmitting of the plurality of data packets including selecting the time lag with which the data packets are transmitted such that the energy store of the energy supplier is subjected to a short, pulse-like load; said transmitting of the plurality of data packets may have the steps of: transmitting a data packet, which is about to be transmitted, of the plurality of data packets at a reduced transmitting power if an amount of electrical energy that can be provided by the energy supplier is sufficient for transmitting the respective data packet at the reduced transmitting power, the reduced transmitting power being reduced by a maximum of 40 dB as compared to the standard transmitting power; or not transmitting or transmitting with delay a data packet, which is about to be transmitted, of the plurality of data packets if an amount of electrical energy that can be provided by the energy supplier is not sufficient for transmitting the respective data packet.

According to another embodiment, a method of operating a data receiver may have the steps of: receiving data packets, the data packets each having a code rate smaller than one and being transmitted via a communication channel with a time lag, so that there are non-transmission periods in between the data packets during which no transmission is performed; said receiving of data packets including determining the data packets within a receive data stream; said receiving of data packets including measuring a receive power of the receive data stream during reception of the respective data packets and measuring a receive power of the receive data stream during the non-transmission periods prior to reception of the respective data packets and/or following reception of the respective data packets so as to determine a change in the receive power of the receive data stream; weighting each of the data packets for further processing on the basis of the determined change in the receive power so as to acquire received data packets; further processing the received data packets, wherein the further processing of the received data packets includes channel decoding of the received data packets which is dependent on the weighting of the received data packets, so as to acquire useful data contained within the data packets.

According to another embodiment, a non-transitory digital storage medium may have a computer program stored thereon to perform the method of operating a data transmission arrangement, the data transmission arrangement having an energy supplier for supplying the data transmission arrangement with electrical energy, the energy supplier having an energy harvesting element for non-line-conducted energy extraction from the environment of the data transmission arrangement, the energy supplier having an energy store for storing the energy extracted by the energy harvesting element, the energy store being configured for short, pulse-like load, said method may have the steps of: determining useful data provided by a sensor element connected to the data transmission arrangement; channel coding of the useful data so as to acquire channel-coded data; splitting up the channel-coded data into a plurality of data packets having a code rate smaller than one; transmitting the plurality of data packets via a communication channel with a time lag, so that there are non-transmission periods in between the data packets during which no transmission is performed, provided that an amount of electrical energy that can be provided by the energy supplier is sufficient for transmitting the respective data packets at a standard transmitting power; said transmitting of the plurality of data packets including selecting the time lag with which the data packets are transmitted such that the energy store of the energy supplier is subjected to a short, pulse-like load; said transmitting of the plurality of data packets may have the steps of: transmitting a data packet, which is about to be transmitted, of the plurality of data packets at a reduced transmitting power if an amount of electrical energy that can be provided by the energy supplier is sufficient for transmitting the respective data packet at the reduced transmitting power, the reduced transmitting power being reduced by a maximum of 40 dB as compared to the standard transmitting power; or not transmitting or transmitting with delay a data packet, which is about to be transmitted, of the plurality of data packets if an amount of electrical energy that can be provided by the energy supplier is not sufficient for transmitting the respective data packet, when said computer program is run by a computer.

According to another embodiment, a non-transitory digital storage medium may have a computer program stored thereon to perform the method of operating a data receiver, said method may have the steps of: receiving data packets, the data packets each having a code rate smaller than one and being transmitted via a communication channel with a time lag, so that there are non-transmission periods in between the data packets during which no transmission is performed; said receiving of data packets including determining the data packets within a receive data stream; said receiving of data packets including measuring a receive power of the receive data stream during reception of the respective data packets and measuring a receive power of the receive data stream during the non-transmission periods prior to reception of the respective data packets and/or following reception of the respective data packets so as to determine a change in the receive power of the receive data stream; weighting each of the data packets for further processing on the basis of the determined change in the receive power so as to acquire received data packets; further processing the received data packets, wherein the further processing of the received data packets includes channel decoding of the received data packets which is dependent on the weighting of the received data packets, so as to acquire useful data contained within the data packets, when said computer program is run by a computer.

According to another embodiment, a data transmission arrangement may have: a determiner for determining useful data provided by a sensor element connected to the data transmission arrangement; a coder for channel coding of the useful data so as to acquire channel-coded data; a splitter for splitting up the channel-coded data into a plurality of data packets having a code rate smaller than one; and a transmitter for transmitting data packets which is configured to transmit the plurality of data packets via a communication channel with a time lag, so that there are non-transmission periods in between the data packets during which no transmission is performed; the splitter for splitting up the channel-coded data being configured to provide at least two data packets of the plurality of data packets with a pilot sequence in each case for synchronizing the data packets in a data receiver, the splitter for splitting up the channel-coded data into a plurality of data packets being configured to vary an arrangement of the pilot sequences in the at least two data packets such that one data packet of the at least two data packets has an arrangement of the pilot sequence which deviates from the arrangement of the pilot sequence of another data packet of the at least two data packets; the splitter for splitting up the channel-coded data being configured to provide a first data packet of the at least two data packets with a pilot sequence arranged between the data contained within the data packet; and the splitter for splitting up the channel-coded data being configured to provide a second data packet of the at least two data packets with a two-part pilot sequence and, a first part of the pilot sequence being arranged before the data contained within the data packet and a second part of the pilot sequence being arranged after the data contained within the data packet.

Embodiments of the present invention provide a data transmission arrangement comprising: energy supply means for supplying the data transmission arrangement with electrical energy; means for determining useful data provided by a sensor element connected to the data transmission arrangement; means for channel coding of the useful data so as to obtain channel-coded data; means for splitting up the channel-coded data into a plurality of data packets having a code rate smaller than one; and means for transmitting data packets which is configured to transmit the plurality of data packets via a communication channel with a time lag, provided that an amount of electrical energy that can be provided by the energy supply means is sufficient for transmitting the respective data packets at a standard transmitting power. The means for transmitting data packets is configured to either transmit a data packet, which is about to be transmitted, of the plurality of data packets at a reduced transmitting power if an amount of electrical energy that can be provided by the energy supply means is sufficient for transmitting the respective data packet at the reduced transmitting power, the reduced transmitting power being reduced by a maximum of 40 dB as compared to the standard transmitting power, or not transmit or to transmit with delay a data packet, which is about to be transmitted, of the plurality of data packets if an amount of electrical energy that can be provided by the energy supply means is not sufficient for transmitting the respective data packet.

Further embodiments of the present invention provide a data transmission arrangement that is self-sufficient in terms of its energy supply. The data transmission arrangement includes an energy supply means for supplying the data transmission arrangement with electrical energy, the energy supply means comprising an energy harvesting element for non-line-conducted energy extraction from the environment of the data transmission arrangement; means for determining useful data provided by a sensor element connected to the data transmission arrangement; means for channel coding of the useful data so as to obtain channel-coded data; means for splitting up the channel-coded data into a plurality of data packets having a code rate smaller than one; and means for transmitting data packets which is configured to transmit the plurality of data packets via a communication channel with a time lag, provided that an amount of electrical energy that can be provided by the energy supply means is sufficient for transmitting the respective data packets at a standard transmitting power. In this context, the means for transmitting data packets is configured to transmit a data packet, which is about to be transmitted, of the plurality of data packets at a reduced transmitting power if an amount of electrical energy that can be provided by the energy supply means is sufficient for transmitting the respective data packet at the reduced transmitting power, the reduced transmitting power being reduced by a maximum of 40 dB as compared to the standard transmitting power; and/or not transmit or to transmit with delay a data packet, which is about to be transmitted, of the plurality of data packets if an amount of electrical energy that can be provided by the energy supply means is not sufficient for transmitting the respective data packet.

Further embodiments provide a data receiver comprising means for receiving data packets, the data packets each having a code rate smaller than one and being transmitted via a communication channel with a time lag, the means for receiving data packets being configured to determine the data packets within a receive data stream, to determine a change in the receive power of the receive data stream which is in each case caused by the transmission of the data packets, and to weight each of the data packets for further processing on the basis of the change in the receive power which is caused in the means for receiving data packets so as to obtain received data packets; and means for further processing the received data packets, configured to perform channel decoding of the received data packets which is dependent on the weighting of the received data packets, so as to obtain useful data contained within the data packets.

Further embodiments provide a data receiver comprising means for receiving data packets, the data packets each having a code rate smaller than one and being transmitted via a communication channel with a time lag, the means for receiving data packets being configured to determine the data packets within a receive data stream, to determine a change in the receive power (or change in the receive energy) of the receive data stream which is in each case caused by the transmission of the data packets, and to further process those data packets of the data packets as received data packets whose change in the receive power (or change in the receive energy) which is caused within the means for receiving data packets exceeds a threshold value selected such that the corresponding data packets are suitable for decoding; and means for further processing received data packets, configured to perform channel decoding of the received data packets so as to determine useful data contained within the data packets.

The present invention is based on the idea of transmitting the plurality of data packets, each of which contains some of the channel-coded data, via a communication channel at a standard transmitting power and with a time lag, provided that an amount of electrical energy that can be provided by the energy supply means is sufficient for this purpose. If the amount of electrical energy that can be provided by the energy supply means is not sufficient for this purpose, however, a data packet, which is about to be transmitted (e.g. in accordance with a queue, the next data packet to be transmitted), of the plurality of data packets will be transmitted at a reduced transmitting power, will not be transmitted or will be transmitted at a later point in time, depending on the amount of electrical energy that is available.

In the transmission of the data packets via a communication channel from the data transmission arrangement that is self-sufficient in terms of its energy supply to a data receiver, the data packets may be interfered with, for example by noise or by other data transmitters which simultaneously transmit data packets within the same or a similar frequency band.

The means for receiving data packets of the data receiver is therefore configured to determine the change in the receive power of the receive data stream that is caused in each case in the means for receiving data packets by the transmitting of the data packets, and to weight each of the data packets for further processing on the basis of the change in receive power that is caused in the means for receiving data packets, so as to obtain received data packets.

Further embodiments of the present invention provide a method of operating a data transmission arrangement. The data transmission arrangement comprises energy supply means for supplying the data transmission arrangement with electrical energy. The method includes determining useful data provided by a sensor element connected to the data transmission arrangement; channel coding of the useful data so as to obtain channel-coded data; splitting up the channel-coded data into a plurality of data packets having a code rate smaller than one; transmitting the plurality of data packets via a communication channel with a time lag, provided that an amount of electrical energy that can be provided by the energy supply means is sufficient for transmitting the respective data packets at a standard transmitting power. In this context, said transmitting of the plurality of data packets comprises transmitting a data packet, which is about to be transmitted, of the plurality of data packets at a reduced transmitting power if an amount of electrical energy that can be provided by the energy supply means is sufficient for transmitting the respective data packet at the reduced transmitting power, the reduced transmitting power being reduced by a maximum of 40 dB as compared to the standard transmitting power; or not transmitting or transmitting with delay a data packet, which is about to be transmitted, of the plurality of data packets if an amount of electrical energy that can be provided by the energy supply means is not sufficient for transmitting the respective data packet.

Further embodiments provide a method of operating a data receiver. The method comprises receiving data packets, the data packets each having a code rate smaller than one and being transmitted via a communication channel with a time lag, said receiving of data packets comprising determining the data packets within a receive data stream and determining a change in the receive power of the receive data stream which is caused in each case by the transmission of the data packets; weighting each of the data packets for further processing on the basis of the change which is caused in the receive power of the receive data stream so as to obtain received data packets; and further processing the received data packets, wherein the further processing of the received data packets comprises channel decoding of the received data packets which is dependent on the weighting of the received data packets, so as to obtain useful data contained within data packets.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
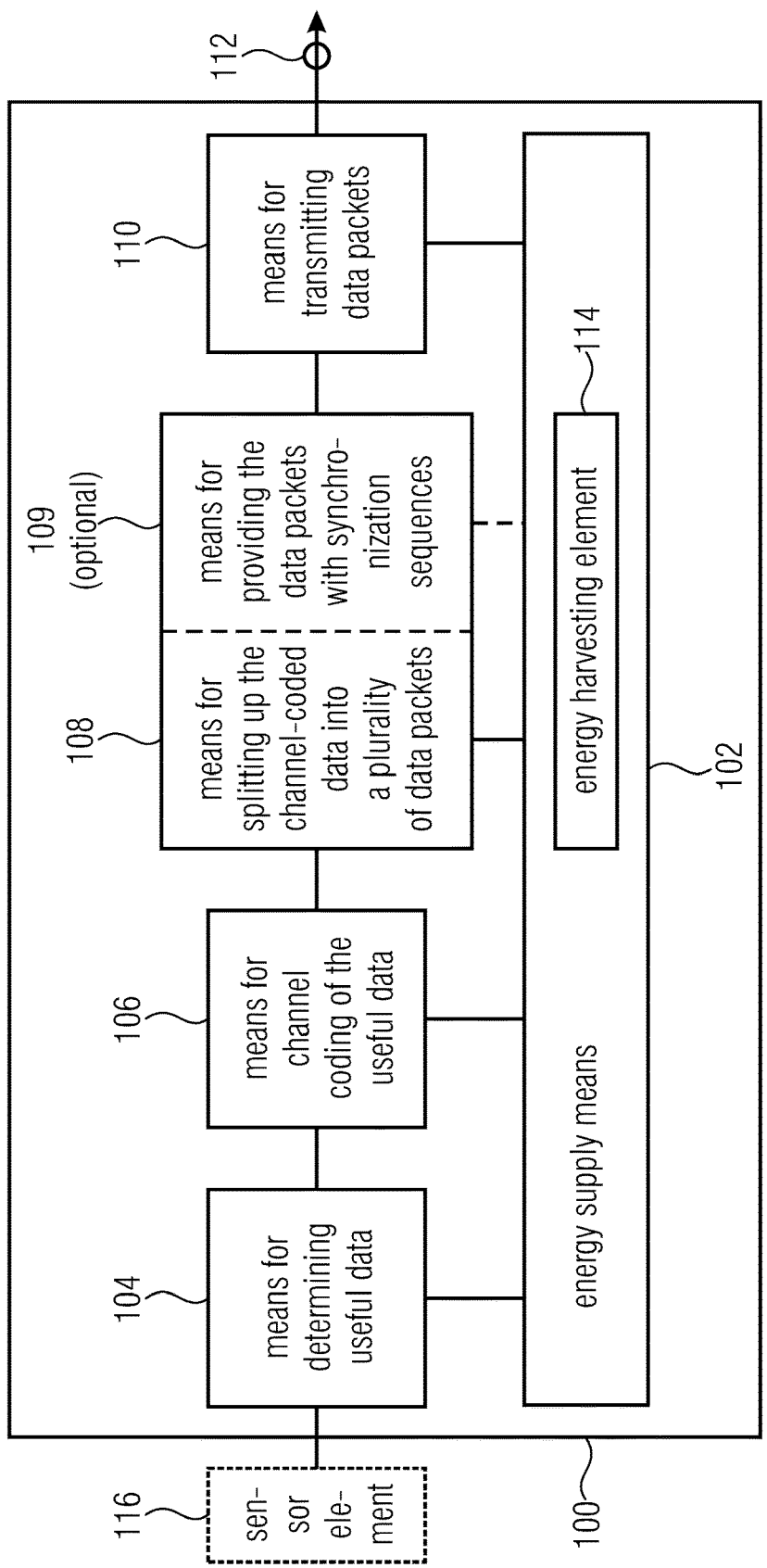
FIG. 1 shows a schematic block diagram of a data transmission arrangement, in accordance with an embodiment of the present invention.

In the subsequent description of the embodiments of the invention, elements that are identical or have identical actions will be referred to by identical reference numerals in the figures so that their descriptions within the different embodiments are mutually exchangeable.

FIG. 1 shows a schematic block diagram of a data transmission arrangement 100, in accordance with an embodiment of the present invention. The data transmission arrangement 100 includes energy supply means 102 for supplying the data transmission arrangement 100 with electrical energy.

Moreover, the data transmission arrangement 100 includes means 104 for determining useful data that is provided by a sensor element 116 connected to the data transmission arrangement 100, means 106 for channel coding of the useful data so as to obtain channel-coded data, and means 108 for splitting up the channel-coded data into a plurality of data packets having a code rate smaller than one.

In addition, the data transmission arrangement 100 includes means 110 for transmitting data packets 112 which is configured to transmit the plurality of data packets via a communication channel with a time lag, provided that an amount of electrical energy that can be provided by the energy supply means 102 is sufficient for transmitting the respective data packets at a standard transmitting power. The means 110 for transmitting data packets 112 is configured to transmit a data packet, which is about to be transmitted, of the plurality of data packets 112 at a reduced transmitting power if an amount of electrical energy that can be provided by the energy supply means 102 is sufficient for transmitting the respective data packet at the reduced transmitting power, the reduced transmitting power being reduced by a maximum of 40 dB (or 1 dB, 3 dB, 6 dB, 9 dB, 10 dB, 12 dB, 15 dB, 18 dB, 21 dB, 24 dB or 30 dB, 40 dB) as compared to the standard transmitting power, or not to transmit a data packet, which is about to be transmitted, of the plurality of data packets 112 or to transmit it with a delay, if an amount of electrical energy that can be provided by the energy supply means 102 is not sufficient for transmitting the respective data packet, e.g. if an amount of electrical energy that can be provided by the energy supply means 102 is smaller than the amount of electrical energy that may be used for transmission at a reduced transmitting power.

In embodiments, the channel-coded data is split up into a plurality of data packets 112, each of which contains only some of the channel-coded data, so that the plurality of data packets 112 are shorter, respectively, than the channel-coded data, or than a telegram containing the channel-coded data, and said channel-coded data is transmitted via a communication channel with a time lag, provided that an amount of electrical energy that can be provided by the energy supply means 102 is sufficient for this purpose. If the amount of electrical energy that can be provided by the energy supply means 102 is not sufficient for this purpose, however, a data packet, which is about to be transmitted, of the plurality of data packets 112 will either be transmitted at a reduced transmitting power or will not be transmitted or will be transmitted at a later point in time, depending on the amount of electrical energy that is available (provided that the amount of electrical energy that can be provided by the energy supply means 102 will be sufficient, at said later point in time, for transmitting at the standard transmitting power or at a reduced transmitting power).

The energy supply means 102 may compromise an energy store, such as a battery or a capacitor, for example. Moreover, the energy supply means 102 may compromise an energy harvesting element 114 for non-line-conducted energy extraction from the environment of the data transmission arrangement 100. When using a small battery (button cell) or an energy harvesting element 114 there may not be sufficient energy available for transmitting the amount of data as desired by the user. In this case, individual data packets of a telegram may be omitted, for example.

What is referred to as energy harvesting is the extraction of electrical energy from the environment, i.e. to convert the (non-electrical) energy that is present in the environment to electrical energy. For example, the energy harvesting element 114 may be configured, for energy extraction purposes, to convert deformation energy, kinetic energy, thermal energy, flow energy, electromagnetic energy or light energy to electrical energy. The energy harvesting element 114 may include, e.g., a solar cell, a thermo-electrical generator, a piezoelectrical crystal or a Peltier element.

Moreover, the energy supply means 102 may compromise an energy store for storing the energy extracted by the energy harvesting element 114. The energy store, e.g. a battery or a capacitor, is typically designed, or suitable, for a short, pulse-like (burst-like) load only.

In this case, the means 110 for transmitting data packets 112 may be configured to select the time lag with which the data packets 112 are transmitted such that a load on the energy store of the energy supply means 102 is reduced. In addition, the means 108 may be configured to split up the channel-coded useful data so as to select a number of data packets 112 into which the channel-coded useful data is split up such that a load on the energy store of the energy supply means 102 is reduced.

The load on the energy store made be influenced, or controlled, by the time lag with which the data packets 112 are transmitted via the communication channel, and by the number of data packets 112 into which the channel-coded useful data is split up (and thus, by the length of the individual data packets).

In addition, the means 110 for transmitting data packets 112 may be configured to transmit the data packets 112 via the communication channel in a narrow-band manner, in order to increase coverage, at a data rate of less than 50 kbit/s, e.g. at 40 kbit/s, 30 kbit/s, 20 kbit/s or 10 kbit/s, instead of, e.g., at a data rate of 100 kbit/s, for example. As a result, the SNR (signal-to-noise ratio) and, thus, also the coverage, will increase at the data receiver. However, this results in that the bit duration and, thus, the emitted energy per bit increase, which counteracts a short, pulse-like load on the energy store. The increased load on the energy store may be compensated for, however, in that the channel-coded data is split up into a plurality of data packets 112 and is transmitted via the communication channel with a time lag, the data packets 112 each being shorter than a single data packet (or telegram) containing the (entire) channel-coded data. For example, the plurality of data packets 112 may each comprise a length of 20 symbols (or 30, 40, or 50 symbols) or less.

The useful data that is determined by the means 104 for determining useful data is provided by a sensor element 116 connected to the transmission arrangement 100. In embodiments, the sensor element 116 may form part of the data transmission arrangement 100, or in other words, the data transmission arrangement 100 may comprise the sensor element 116. The sensor element 116 may be a temperature sensor, a state sensor, a heat, electricity or water meter. The useful data thus may be a sensor value, a state (e.g. switch position) or a meter reading. The useful data may comprise an amount of data of less than 1 kbit.

The useful data provided by the sensor element 116 may be channel-coded by the means 106 for channel-coding of the useful data so as to obtain channel-coded data. The means 108 for splitting up the channel-coded data may be configured to split up the channel-coded data into a plurality of data packets 112, so that the plurality of data packets 112 each comprise only some of the channel-coded data or, in other words, so that the plurality of data packets 112 are shorter than a single data packet (or telegram) which contains the (entire) channel-coded data. The means 110 for transmitting data packets subsequently transmits the plurality of data packets 112 via the communication channel with a time lag; i.e in between the data packets 112, herein also referred to as hops, there are breaks (non-transmission periods) during which no transmission is performed.

Moreover, the means 110 for transmitting data packets may be configured to transmit the plurality of data packets 112 at different frequencies (frequency hopping). The means 110 for transmitting data packets 112 may transmit, e.g., the plurality of data packets 112 at several (at least two) frequencies simultaneously and/or may change, or vary, the transmitting frequency during transmission of the plurality of data packets 112.

In embodiments, the means 108 for splitting up the channel-coded data into a plurality of data packets 112 may be configured to provide at least two of the data packets with a synchronization sequence for synchronizing the data packets within a data receiver. Of course, the data transmission arrangement 100 may also comprise means 109 for providing the data packets with synchronization sequences. In this context, the means 108 for splitting up the channel-coded data into a plurality of data packets 112 (or the means 109 for providing the data packets with synchronization sequences) may be configured to vary an arrangement of the synchronization sequences in the at least two data packets, so that a data packet of the at least two data packets comprises an arrangement of the synchronization sequence which deviates from the arrangement of the synchronization sequence of another data packet of the at least two data packets.

For example, the means 108 for splitting up the channel-coded data into a plurality of data packets 112 may be configured to provide a first data packet of the at least two data packets with an synchronization sequence such that the synchronization sequence is arranged at a beginning (or an end, or, in a split-up manner, at a beginning and at an end (see FIG. 5b)) of the data packet and to provide a second data packet of the at least two data packets with a synchronization sequence such that the synchronization sequence is arranged between the channel-coded data contained within the second data packet.

Of course, the means 108 for splitting up the channel-coded data into a plurality of data packets 112 may also be configured to provide each of the data packets with a synchronization sequence for synchronizing the data packets 112 within a data receiver and to vary an arrangement of the synchronization sequences within the data packets 112 such that at least one data packet of the data packets 112 comprises an arrangement of the synchronization sequence which deviates from the arrangement of the synchronization sequence of another data packet of the data packets 112.

Figure 2:
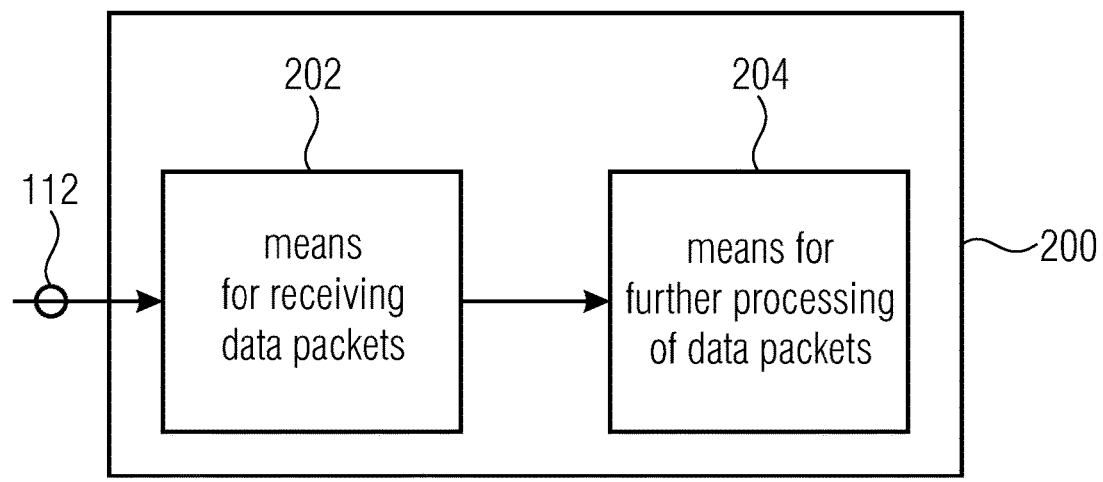
FIG. 2 shows a schematic block diagram of a data receiver, in accordance with an embodiment of the present invention.

FIG. 2 shows a schematic block diagram of a data receiver 200, in accordance with an embodiment of the present invention. The data receiver 200 comprises means 202 for receiving data packets 112, the data packets 112 each having a code rate smaller than one and thus being transmitted via a communication channel with a time lag. The means 202 for receiving data packets 112 is configured to determine the data packets 112 within a receive data stream so as to determine a change in the receive power (or a change in the receive energy) of the receive data stream that is caused in each case by the transmission of the data packets 112, and to weight each of the data packets, for further processing, on the basis of the change in the receive power (or change in the receive energy) caused within the means 202 for receiving data packets 112, so as to obtain received data packets. Moreover, the data receiver 200 comprises means 202 for further processing of received data packets which is configured to perform channel decoding of the received data packets that is dependent on the weighting of the received data packets, so as to determine useful data contained within the data packets.

In embodiments, data packets may be interfered with during transmission of the data packets 112 via a communication channel from the data transmission arrangement 100 to the data receiver 200, for example by noise or by other data transmitters which simultaneously transmit data packets within the same or a similar frequency band. The means 202 for receiving data packets 112 is configured to filter out data packets that have been interfered with so as to determine the change in the receive power of the receive data stream which is in each case caused by the transmission of the data packets 112 within the means 202 for receiving data packets 112 of the data receiver 200, so as to weight each of the data packets on the basis of the change in the receive power which is caused within the means 202 for receiving data packets 112, so that the means 204 for further processing of the data packets may perform channel decoding of the received data packets that is dependent on the weighting, so as to determine the useful data contained within the data packets. The change in the receive power of the receive data stream which is caused by the transmission of the data packets 112 in each case thus is determined and used for weighting the data packets for or during processing.

The means 204 for further processing of the received data packets may be configured to take greater account, in the channel decoding, of data packets having a higher weighting than of data packets having a lower weighting. A received data packet may thus be considered in the decoding in a weighted manner. The higher the receive power, the more intensely it can be weighted in the decoding.

The means 202 for receiving data packets 112 may be configured to further process those data packets of the data packets 112 as received data packets whose change in the receive power which is caused within the means 202 for receiving data packets 112 exceeds a threshold value selected such that the corresponding data packets are suitable for decoding. Moreover, the means 202 for receiving data packets 112 may be configured to discard those data packets of the data packets 112 whose change in the receive power which is caused within the means 202 for receiving data packets 112 is smaller than or equal to the threshold value.

Evidently, the means 202 for receiving data packets 112 may also be configured to take into account, with an increase in weighting, all of the data packets in the channel decoding with an increasing change in the receive power. Moreover, the means 202 for receiving data packets may also be configured to determine, on the basis of the change in the receive power, a probability with which a data packet was transmitted and to weight the data packets on the basis of the probability in each case. Of course, the means 202 for receiving data packets 112 may also be configured to evaluate a different characteristic of the receive data stream, e.g. spectral properties, to determine whether or not a data packet was transmitted and with which weighting it will have to be taken into account in the subsequent further processing/channel decoding.

The means (202) for receiving data packets (112) may be configured to further process those data packets of the data packets (112) as received data packets whose change in the receive power which is caused within the means (202) for receiving data packets (112) exceeds a threshold value selected such that the corresponding data packets are suitable for decoding (channel decoding), and to discard those data packets of the data packets (112) whose change in the receive power which is caused within the means for receiving data packets is smaller than or equal to the threshold value.

Moreover, the means 202 for receiving data packets 112 may be configured to determine, by means of the change in the receive power of the receive data stream, whether or not a data packet has been transmitted and/or to determine, by means of the change in the receive power of the receive data stream, whether or not a transmitted data packet has been superimposed by an interferer. The means 202 for receiving data packets 112 may thus be configured to determine, e.g. by means of a comparison of the receive power upon reception at other points in time, whether or not a different subscriber is transmitting within the channel (transmission channel).

In addition, the means 202 for receiving data packets 112 may be configured to determine a receive power of the receive data stream prior to reception of the respective data packet, during reception of the respective data packet and/or following reception of the respective data packet, so as to determine the change in the receive power of the receive data stream which is caused by the transmission of the respective data packet.

In embodiments, each of the data packets 112 may be provided with a synchronization sequence for synchronizing the respective data packet within the data receiver 200. In this case, the means 202 for receiving data packets 112 may be configured to locate the data packets 112 within the receive data stream on the basis of the synchronization sequences so as to determine the data packets 112 within the receive data stream. The means 204 for further processing of the received data packets may be configured to adapt the weighting of the received data packets for subsequent further processing/channel decoding on the basis of the synchronization sequences of the received data packets. Also, the means 204 for further processing of the received data packets may determine, on the basis of the synchronization sequences of the received data packets, those data packets which are not or very suitable for decoding, and said means 204 may take account of said data packets with a lower weighting during channel decoding (or discard same).

Figure 3:
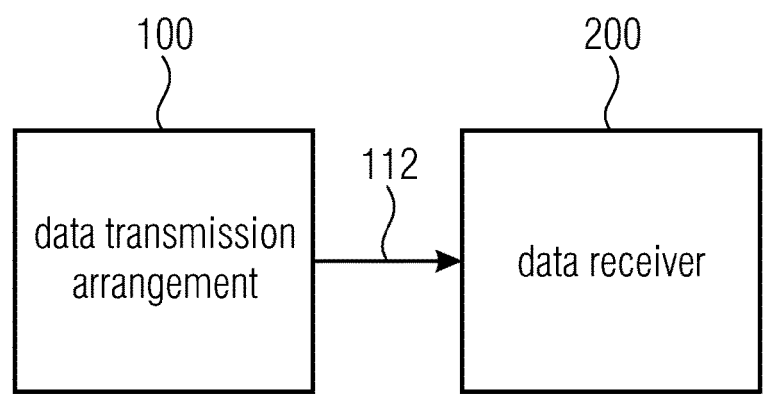
FIG. 3 shows a schematic block diagram of a system comprising a data transmission arrangement and a data receiver, in accordance with an embodiment of the present invention.

FIG. 3 shows a schematic block diagram of a system 300, in accordance with an embodiment of the present invention. The system comprises the data transmission arrangement 100 shown in FIG. 1 and the data receiver 200 shown in FIG. 2.

The system 300 shown in FIG. 3 will be described in more detail below. However, the description which follows is equally applicable to the data transmission arrangement 100 shown in FIG. 1 and to the data receiver 200 shown in FIG. 2.

As was already described above, the energy supply means 102 of the data transmission arrangement 100 comprises an energy harvesting element 114. In transmitters 100 which extract their energy from the environment via an energy harvesting element 114 (or by means of an energy harvesting method), e.g. via light, temperature differences or vibrations, a constant energy supply may not be possible under certain circumstances. The same may also apply to data transmission arrangements 100 which are battery-powered, but wherein only a limited amount of energy may be extracted per time unit. In order to be able to work with this variable energy supply, in embodiments the channel-coded data is split up into a plurality of data packets 112 and transmitted via a communication channel with a time lag. In addition, data packets 112 may not be transmitted or may be transmitted at a reduced transmitting power, depending on the energy supply. Embodiments also describe approaches of how the data transmission arrangements 100 may then be synchronized and detected (channel-decoded) with missing packets or packets which have been interfered with. This is applied in particular when many data transmission arrangements 100 transmit simultaneously and interfere with each other, or when other systems operate within the same frequency band and thus interfere.

Figure 4:
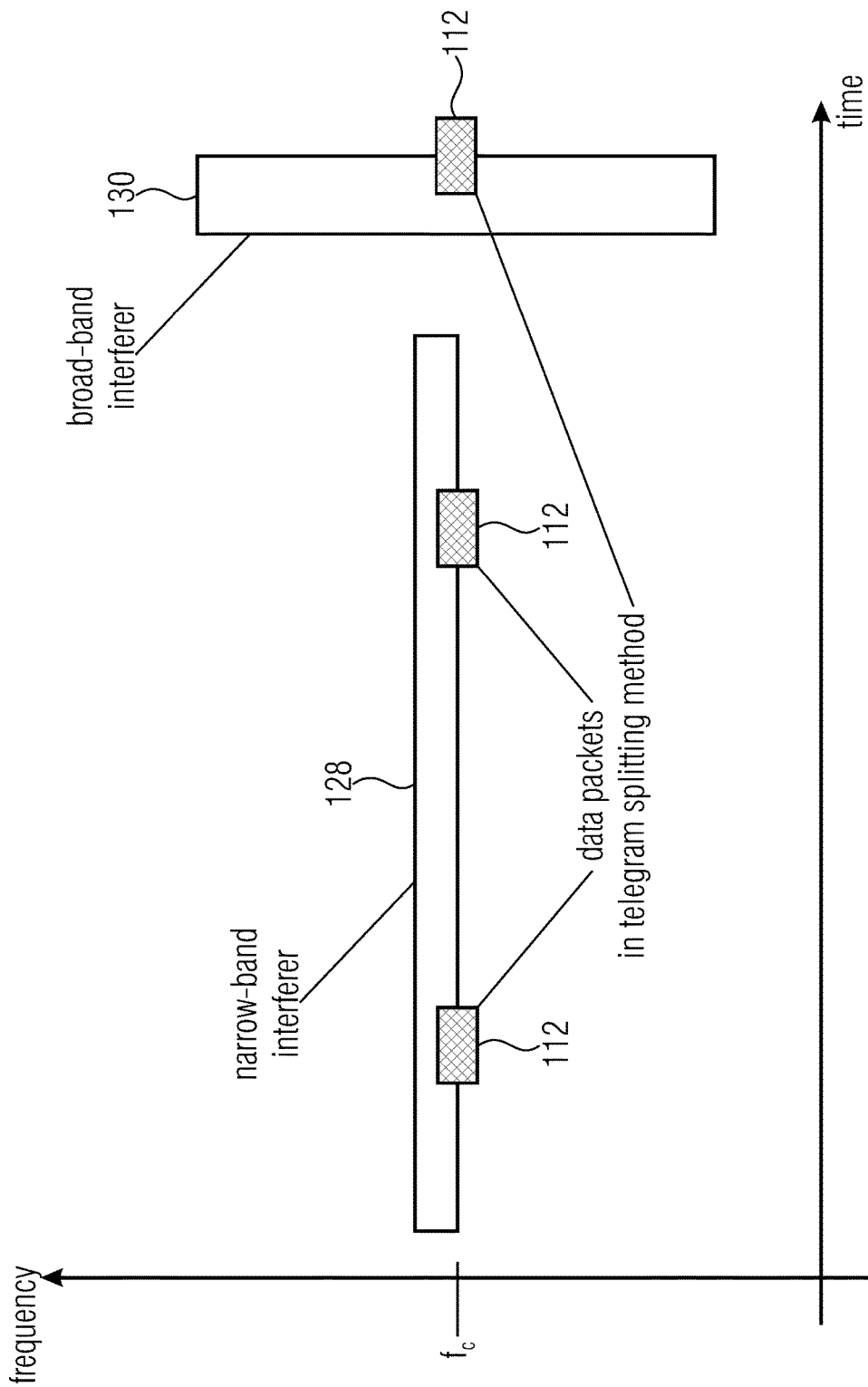
FIG. 4 shows, in a diagram, a spectral occupancy of the transmission channel via which the data packets are transmitted, plotted over time.

In a diagram, FIG. 4 shows a spectral occupancy of the transmission channel via which the data packets are transmitted, plotted over time. To detect an interferer, one initially differentiates between a narrow-band interferer 128 having a similar bandwidth of approx. 1 kBit/s or less and broad-band interferers 130 having a bandwidth larger than 1 kBit/s. Since narrow-band transmission systems typically do not use any telegram splitting methods (TS), the transmission duration of a data packet to be transmitted is considerably longer than in the telegram splitting method. This is why one may detect, by measuring the receive power before and/or after a TS data packet 112, whether or not another data packet has been transmitted by another transmitter or system. If there is a receive power at the same frequency before and/or after the TS data packet 112, an interference signal will be present, and the TS data packet 112 will not be further used for decoding.

Since the narrow-band interferer may exhibit a frequency deviation as compared to the TS data packet, a receive power that is lower, due to the frequency offset, than that actually generated by the interferer may be measured by measuring the receive power at the transmission frequency fc of the TS data packet 112. Therefore, it may be useful to determine the receive power also in the adjacent frequency ranges of the TS data packet 112. This may also be advantageous in particular with broad-band interferers 130. Broad-band interferers 130 having a higher data rate occupy a larger frequency bandwidth within the spectrum. However, the transmitted data packets are considerably shorter in time as compared to narrow-band transmission systems due to the higher data rate, given the same amount of data. In the worst case, the data packets are equal in length or shorter than the data packet 112 in the TS method. Then it may occur that no interferer can be determined by measuring the receive power before or after the TS data packet 112. A broad-band interferer may then be determined by measuring the receive power during the TS data packet 112 within the frequency ranges directly adjacent to the TS data packet 112.

In embodiments, the data transmission arrangement (transmitter) 100 transmits with a limited energy supply in the telegram splitting method (TS method), or in other words, the channel-coded data (telegram) is split up into a plurality of data packets 112 and transmitted via a communication channel with a time lag. In event of insufficient energy, individual data packets 112 are not transmitted or are simply transmitted at a reduced transmitting power. In the data receiver 200, received data packets (packets) 112 which have not or only slightly been interfered with can be filtered out of the receive data stream and be channel-decoded. Data packets which have been interfered with cannot be taken into account or can only be taken into account with lower weighting. In addition, it can be determined, within the data receiver 200, whether or not and/or with which level of probability a data packet was transmitted by the data transmission arrangement 100 and whether or not this data packet (transmission packet or sub-packet) has been interfered with. If the data packet (transmission packet) 112 has not been interfered with, it will be used, otherwise it will not be used or will be used with a lower weighting, whereby the result of the channel decoding can be improved. In order to determine whether or not data packets (sub-packets) 112 have been interfered with during transmission via the communication channel, the receive power of the receive data stream prior to reception of the respective data packets and following reception of the respective data packets may be measured within the data receiver 200 and may be correlated with one another and with the receive energy of the respective data packets (received sub-packet energy). In addition, interference may be determined by means of the data packets (sub-packets) 112, in particular of the synchronization sequences (pilots). Moreover, the receive energies of different data packets 112 at the same frequency or at adjacent frequencies may be compared. In addition, a continuity of the receive power within the respective data packet (sub-packet) 112 may be monitored. For example, the EVM (error vector magnitude) measurement can be used, by means of which one can verify whether or not the received constellation point matches the expected constellation point. Due to the shortness of the data packets 112, the probability that interference packets are longer is high. Unlike in methods used today, the telegram is interrupted, which allows measuring the interference power between the data packets (packets) 112. A good synchronization may be used for accurately determining the transmission times.

For error protection codes it is very advantageous to know whether or not, and to what extent, received symbols have been interfered with. It may be much better to discard the information within the symbols that has been interfered with than to use it. In communications engineering, there is the description in LogLikelihoodRations which indicates the reliability of information. When it is known exactly which symbols have been interfered with, error protection codes such as convolutional codes; Reed Solomon codes or turbo codes, for example, may restore telegrams (receive packets) with a larger amount of missing symbols as compared to symbols which have been interfered with but are not known to have been interfered with. To determine how reliable the received information is, in embodiments data is recorded not only during the hop (or the data packets) 112, but also slightly before and after. Said before/after information is also used for estimating the symbol reliability. For example, if the power level at the receive frequency, as compared to the average power level at the receive frequency, is high before and after, the intensity of an interference by interferers which are caused by other transmitters, for example, may be estimated.

If the system 300 includes only one receiver 200 and uses frequency hopping, it is useful for this purpose to have non-transmission periods between the hops (data packets) 112 and to fully or partly make use of said periods at the data receiver 300 in order to detect whether or not an interferer is being active. This is applied by means of the TS method and is evaluated in the method described. In this manner, one may estimate or detect whether or not, and to what extent, the received symbols have been interfered with and can be used. In the extreme case, the TS receiver 200 will only take those data packets (sub-packets) 112 which are very likely to not have been interfered with.

If a telegram is transmitted continually, it will not be readily possible, particularly with the small data packets (sub-packets) 112 enabled by the TS method, to detect where interferers, which exhibit a power similar to that of the useful signal or even smaller than that of the useful signal, superimpose on and thus interfere with said useful signal (intense interferers are easier to detect since here the signal level increases strongly, this can also be ascertained while a useful signal is being received). Thus, the telegram symbols which have been interfered with cannot easily be discarded or recognized as having been interfered with. If only a limited amount of transmission energy is available, the TS method will be used for the transmission, and thus, the performance capability of the transmission system will be increased since no transmission energy is consumed in the non-transmission periods, but the receiver 200 will be able to there ascertain the state of the channel, i.e. whether or not interferers are being active. The more the telegram is decomposed into data packets (partial packets) 112, the more accurately the channel state can be estimated for the data packet (partial packet) 112 since the data packet (partial packet) 112 itself becomes smaller and thus reduces the probability that the channel state changes during the duration of the data packet (partial packet) 112, i.e. that an interferer starts to transmit. For sensor nodes using an energy harvesting current source, the TS method can be applied in a very advantageous manner. On the one hand, smaller packets can be transmitted for which less energy needs to be temporarily stored (see DE 10 2011 082 098 A1). On the other hand, it is possible, if no transmission energy is currently available, to simply not transmit a hop 112 or to transmit it with reduced power. For example by comparing the transmission energy on the channel before/after the actual hop time slot. To this end, the signal power Pv before the time slot at which a hop 112 should arrive, the signal power Pw during the time slot at which a hop 112 should arrive and the signal power Pn after the time slot at which a hop 112 should arrive may be measured. If Pw is higher than Pv and Ph, it will be safe for the data receiver 200 to assume that the data transmission arrangement has transmitted the hop (or the data packet) 112.

If there is only one hop that the data transmission arrangement 100 (sensor node) has not transmitted, the data receiver 200 will be able to recognize this (possibly only the probability that the data transmission arrangement 100 has not performed transmission) and to use this information in the forward error correction. If forward error correction is used or, even more specifically, if a so-called erasure code is used (these are codes which can deal very well with missing parts of information; normal convolutional codes can be used here, but also specific codes such as the Fountain codes), the data receiver 200 will be able to reconstruct the telegram (receive packet) if a sufficient amount of other symbols have been received. If the receiver 200 has sufficient symbols, it can try to decode.

In order to detect a transmitted telegram (i.e. to find the frequency and/or the point in time of the hopping pattern), it is not absolutely necessary, given suitable sensitivity of the detection, to receive all synchronization hops (if dedicated hops comprising synchronization information are used) and/or all data hops with pilots. By suitably selecting the detection threshold and the emission of a sufficient number of synchronization hops, or data hops with pilots, the detection may also receive transmission arrangements 100 (sensor nodes) which for energy-related reasons refrain from transmitting a number of hops 112. What is important here is that a hop 112 by itself is not sufficient for detection; several hops 112 are evaluated so as to detect a telegram by means of the received pattern of synchronization hops or pilots in data hops.

What follows is a description of a simplification and/or improvement of the synchronization.

In some or all of the hops 112, a synchronization pattern (sync pattern) (so-called pilot symbols) can be transmitted. In embodiments, the sync pattern is alternated by two or more different arrangements of the pilots.

Figure 5A:
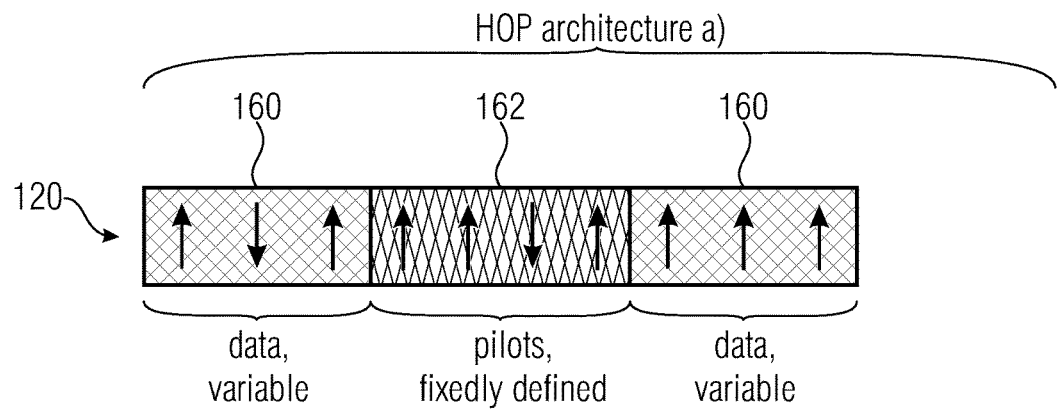
FIG. 5a shows a schematic view of a data packet in a complex vector representation with a synchronization sequence arranged between the data contained within the data packet.

FIG. 5a shows a schematic view of a data packet 112 with a synchronization sequence 162 arranged between the data 160 contained within the data packet 112 (hop architecture a)). FIG. 5a shows the data packet 112 (receive signal) in a complex vector representation.

Figure 5B:
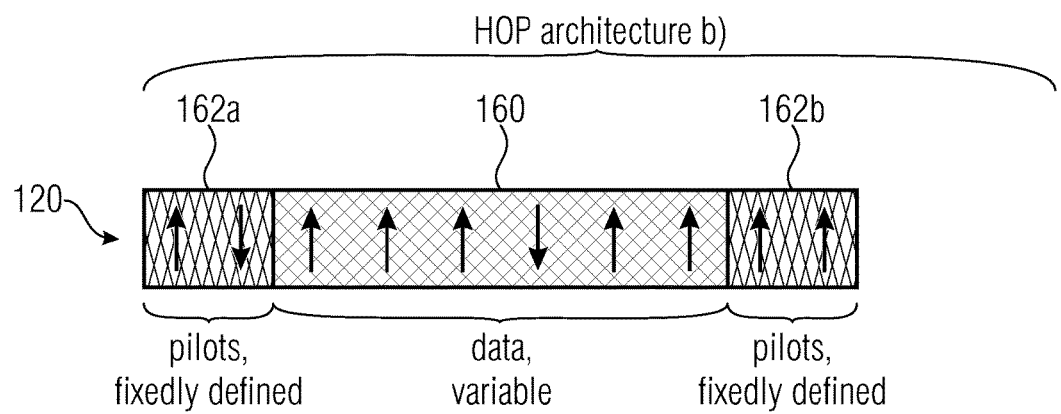
FIG. 5b shows a schematic view of a data packet in a complex vector representation with a two-part synchronization sequence, a first part of the synchronization sequence being arranged before the data contained within the data packet, and a second part of the synchronization sequence being arranged after the data contained within the data packet.

FIG. 5b shows a schematic view of a data packet 112 with a two-part synchronization sequence 162a and 162b, a first part of the synchronization sequence 162a being arranged before the data 160 contained within the data packet 112, and a second part of the synchronization sequence 162b being arranged after the data 160 contained within the data packet 112 (hop architecture b)). FIG. 5b shows the data packet 112 (receive signal) in a complex vector representation.

With the arrangement of the synchronization sequence that is shown in FIG. 5a, a synchronization can be performed more easily in the event of a frequency offset since the phase due to the frequency offset does not change so much between the pilot symbols. With the arrangement of the synchronization sequence that is shown in FIG. 5b, the frequency offset may be estimated better since the phase changes to a more pronounced degree.

Thus, the arrangement of the synchronization sequence that is shown in FIG. 5a may be used better for performing an initial synchronization, e.g. by means of correlation, whereas the arrangement of the synchronization sequence that is shown in FIG. 5b may be better used for performing frequency estimation. Knowledge of the exact frequency offset enables, among other things, utilization of efficient types of modulation.

The pilots may also be used for channel equalization. If simple equalization is used which involves only the phase (e.g. with MSK (minimum shift keying) modulation, a specific method of frequency-shift keying), the fact that the pilots are arranged differently is not an obstacle since said pilots are irrelevant for phase estimation.

In embodiments, it is possible to vary not only the positions of the pilots, but also the pilots themselves within the hops 112. If a pilot pattern (content of the pilots rather than the arrangement) is used which occupies only a narrow spectral range, said pilot pattern may be found by means of less computing expenditure than for a pilot pattern which occupies a broad spectral range. For example, if in several hops 112, pilots are used which are identical, they may be found by means of little computing expenditure via a so-called moving sum. However, it is not readily possible with such a pilot pattern to determine the exact synchronization time. To determine the synchronization time more accurately, a suitable pilot pattern with a broader spectral range will then be used in other hops 112. In this context, no additional energy may be wasted on synchronization since the pilots are also or anyway used for channel equalization.

For synchronization, it is possible to consider not only one single hop 112 but several ones since a known hopping pattern is used.

To this end, it shall be assumed that the frequency does not change, or changes to a small extent only, across the hops 112. To render synchronization more robust, the proposed estimation of the channel state is used.

What follows is a more detailed explanation of the advantages of splitting up the synchronization sequences (pilots).

Due to inaccuracies present within the oscillators, a frequency offset occurs between the transmitter 100 and the receiver 200. In a 10 ppm oscillator, this frequency offset already amounts to approx. ±8.7 kHz at a transmitting frequency of 868 MHz. If one transmits, as is the case in the application outlined, very narrow-band signals, such as with a symbol rate of 1 kHz, for example, the symbol rate will already be way below the frequency by which the receive signal is shifted in relation to the transmit signal.

One approach to nevertheless being able to detect the signals consists in that the receiver receives on several adjacent narrow-band frequency bands at the same time and tries to find the signal of the transmitter.

Figure 5C:
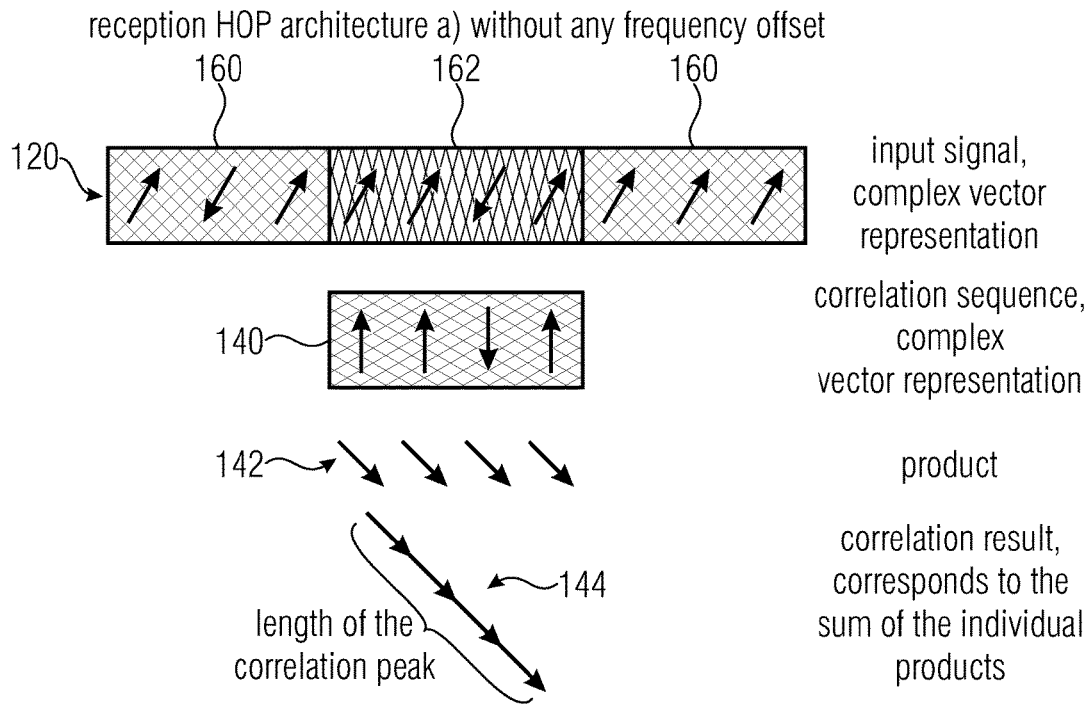
FIG. 5c shows a schematic view of a data packet in a complex vector representation with a synchronization sequence arranged between the data contained within the data packet, the data packet comprising no frequency offset.

FIG. 5c shows a schematic view of a data packet 112 in a complex vector representation with a synchronization sequence 162 arranged between the data 160 contained within the data packet 112 (hop architecture a)), the data packet 112 (receive signal) exhibiting no frequency offset. As can be seen in FIG. 5c, the receive signal 112 exhibits a phase shift as compared to the transmit signal in accordance with the hop architecture a) (FIG. 5a) since the transmitter 100 and the receiver 200 do not operate in a phase-synchronized manner.

In addition, FIG. 5c represents the correlation sequence 140 in a complex vector representation, the product 142 of the synchronization sequence 162 and of the correlation sequence 140, and the correlation result 144, which corresponds to the sum of the individual products.

If the signal hop architecture a) in the case without any frequency offset (FIG. 5c) is directly correlated with the pilot frequency, a high correlation peak will result in the event of exact temporal correspondence. This correlation peak may be used by the receiver 200 for detecting that a hop 112 has been transmitted here, and/or the receiver 200 may use the combination of correlation peaks of several hops 112 in order to detect this.

Figure 5D:
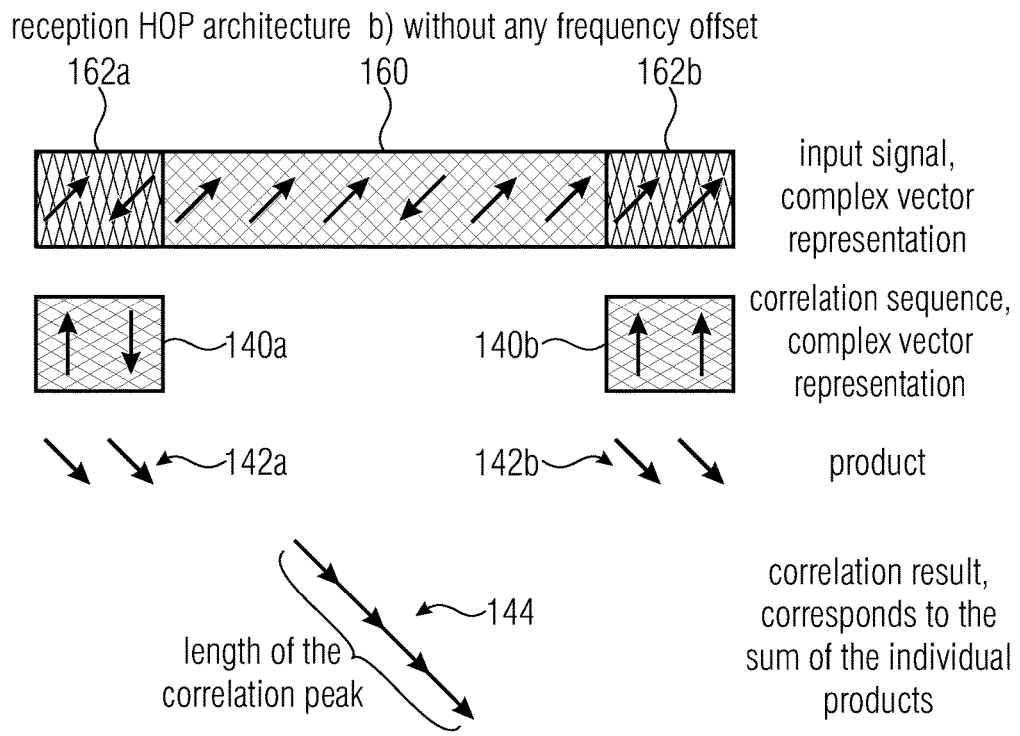
FIG. 5d shows a schematic view of a data packet in a complex vector representation with a two-part synchronization sequence, a first part of the synchronization sequence being arranged before the data contained within the data packet, and a second part of the synchronization sequence being arranged after the data contained within the data packet, and the data packet comprising no frequency offset.

FIG. 5d shows a schematic view of a data packet 112 in a complex vector representation with a two-part synchronization sequence 162a and 162b, a first part of the synchronization sequence 162a being arranged before the data 160 contained within the data packet 112, and a second part of the synchronization sequence 162b being arranged after the data 160 contained within the data packet 112 hop architecture b), and wherein the data packet 112 (receive signal) exhibits no frequency offset. By analogy with FIG. 5c, the receive signal 112 shown in FIG. 5d also exhibits a phase shift as compared to the transmit signal in accordance with the hop architecture b) (FIG. 5b) since the transmitter 100 and the receiver 200 do not operate in a phase-synchronized manner.

In addition, FIG. 5d represents the two-part correlation sequence 140a and 140b in a complex vector representation in each case, the products 142a and 142b of the synchronization sequences 162a and 162b and of the correlation sequences 140a and 140b, and the correlation result 144, which corresponds to the sum of the individual products.

If a frequency offset occurs between the transmitter 100 and the receiver 200, the correlation peak will decrease since the individual products from the receive signal to the correlation sequence will deviate from one another in the phase, as will be explained in more detail below.

Figure 5E:
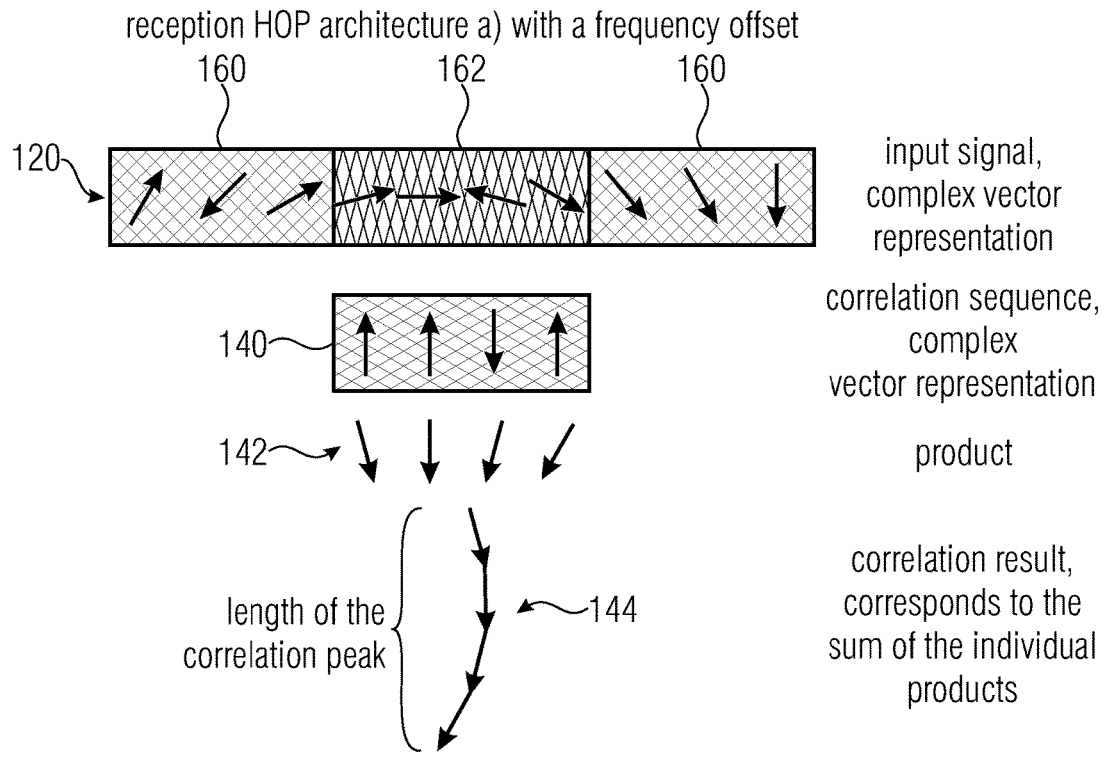
FIG. 5e shows a schematic view of a data packet in a complex vector representation with a synchronization sequence arranged between the data contained within the data packet, the data packet comprising a frequency offset.

FIG. 5e shows a schematic view of a data packet 112 with a synchronization sequence 162 arranged between the data 160 contained within the data packet 112 (hop architecture a)), the data packet 112 (receive signal) comprising a frequency offset.

In addition, FIG. 5e represents the correlation sequence 140 in a complex vector representation, the product 142 of the synchronization sequence 162 and of the correlation sequence 140, and the correlation result 144, which corresponds to the sum of the individual products.

As can be seen in FIG. 5e, the correlation peak in this case has become slightly smaller. Thus, this pilot arrangement is robust toward frequency offset. Consequently, the receiver 200 needs to search for the transmit signal on fewer frequencies at the same time.

However, the robustness toward frequency offset simultaneously also represents a disadvantage. It is not possible to estimate the actual frequency offset well with said pilots since a frequency offset actually does not have a strong effect. If the frequency offset cannot be estimated accurately, this is disadvantageous for the decoding of many modulation types since they will exhibit a poorer performance capability as a non-corrected frequency offset increases than with an accurate correction. It is for this accurate correction that an accurate estimation of the frequency offset is needed.

Figure 5F:
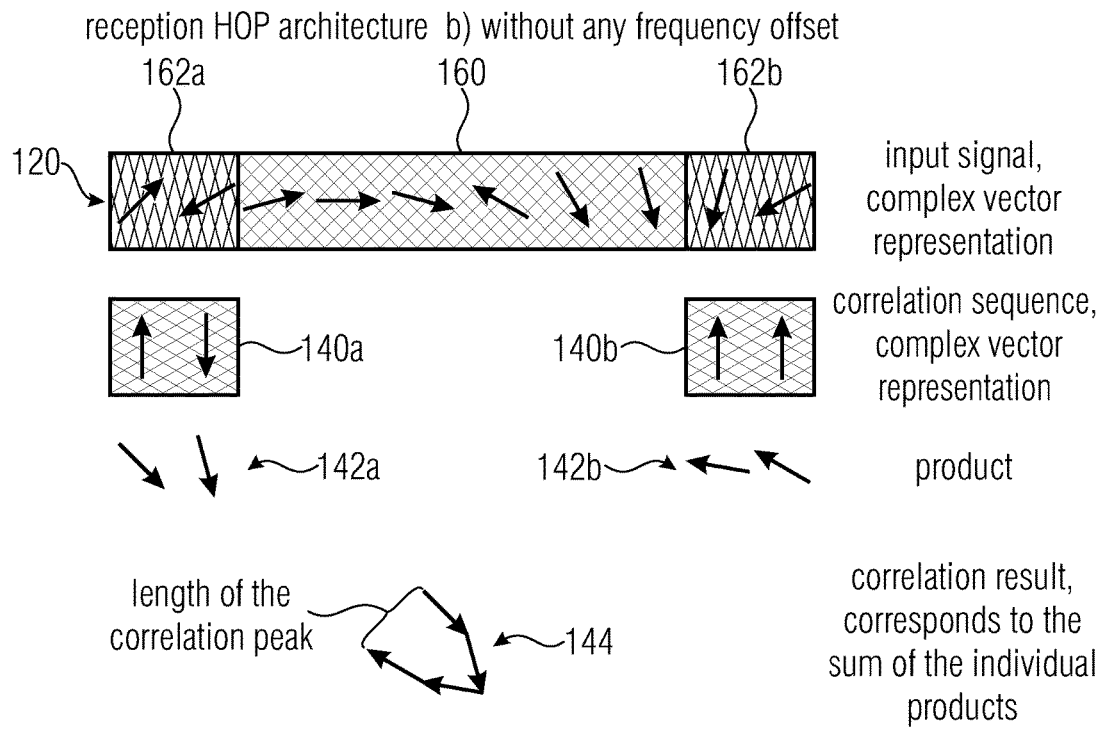
FIG. 5f shows a schematic view of a data packet in a complex vector representation with a two-part synchronization sequence, a first part of the synchronization sequence being arranged before the data contained within the data packet, and a second part of the synchronization sequence being arranged after the data contained within the data packet, and the data packet comprising a frequency offset.

This is different in the pilot arrangement of the hop architecture b) since here the highest deviation possible of the correlation peak occurs with a frequency offset, as can be seen from FIG. 5f.

FIG. 5f shows a schematic view of a data packet 112 in a complex vector representation with a two-part synchronization sequence 162a and 162b, a first part of the synchronization sequence 162a being arranged before the data 160 contained within the data packet 112, and a second part of the synchronization sequence 162b being arranged after the data 160 contained within the data packet 112 hop architecture b), and wherein the data packet 112 (receive signal) exhibits a frequency offset.

In addition, FIG. 5f represents the two-part correlation sequence 140a and 140b in a complex vector representation in each case, the products 142a and 142b of the synchronization sequences 162a and 162b and of the correlation sequences 140a and 140b, and the correlation result 144, which corresponds to the sum of the individual products.

Thus, the frequency offset may be estimated well; in the event of a frequency offset, a much smaller correlation peak will result than with the hop architecture a).

Improvements and advantages as compared to conventional technology consist in that the receiver can detect this transmit signal 112 with (a lower) computing power while still being able to accurately estimate the frequency offset.

Figure 6:
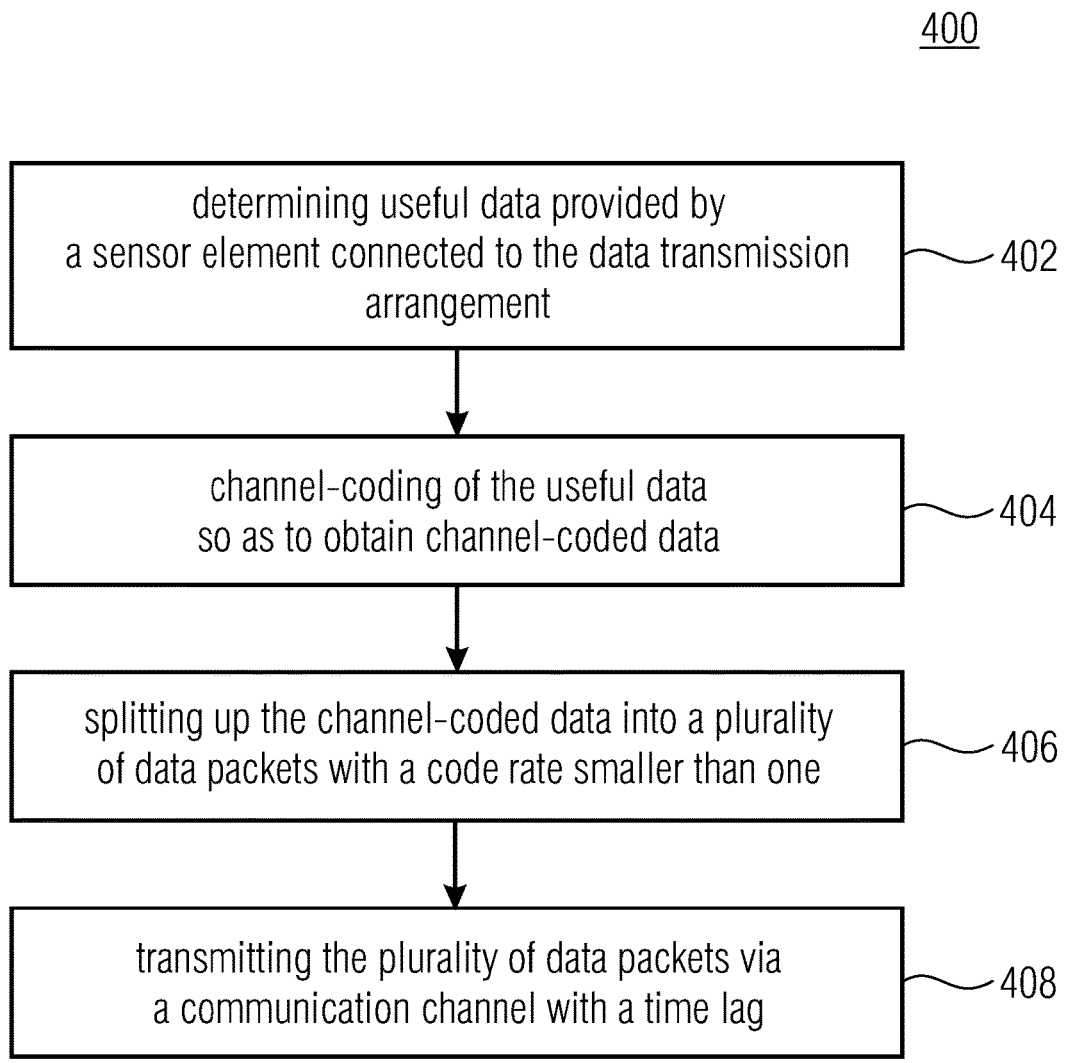
FIG. 6 shows a flow chart of method of operating a data transmission arrangement, in accordance with an embodiment of the present invention.

FIG. 6 shows a flowchart of a method 400 of operating a data transmission arrangement 100, in accordance with an embodiment of the present invention. The data transmission arrangement 100 comprises energy supply means 102 for supplying the data transmission arrangement 100 with electrical energy. The method includes determining 402 useful data provided by a sensor element 116 connected to the data transmission arrangement 100; channel coding 404 of the useful data so as to obtain channel-coded data; splitting up 406 the channel-coded data into a plurality of data packets 112 having a code rate smaller than one; transmitting 408 the plurality of data packets 112 via a communication channel with a time lag, provided that an amount of electrical energy that can be provided by the energy supply means 102 is sufficient for transmitting the respective data packets 112 at a standard transmitting power. Said transmitting 408 of the plurality of data packets 112 includes transmitting a data packet, which is about to be transmitted, of the plurality of data packets 112 at a reduced transmitting power if an amount of electrical energy that can be provided by the energy supply means 102 is sufficient for transmitting the respective data packet at the reduced transmitting power, the reduced transmitting power being reduced by a maximum of 40 dB as compared to the standard transmitting power; and/or not transmitting or transmitting with delay a data packet, which is about to be transmitted, of the plurality of data packets 112 if an amount of electrical energy that can be provided by the energy supply means 102 is not sufficient for transmitting the respective data packet.

Figure 7:
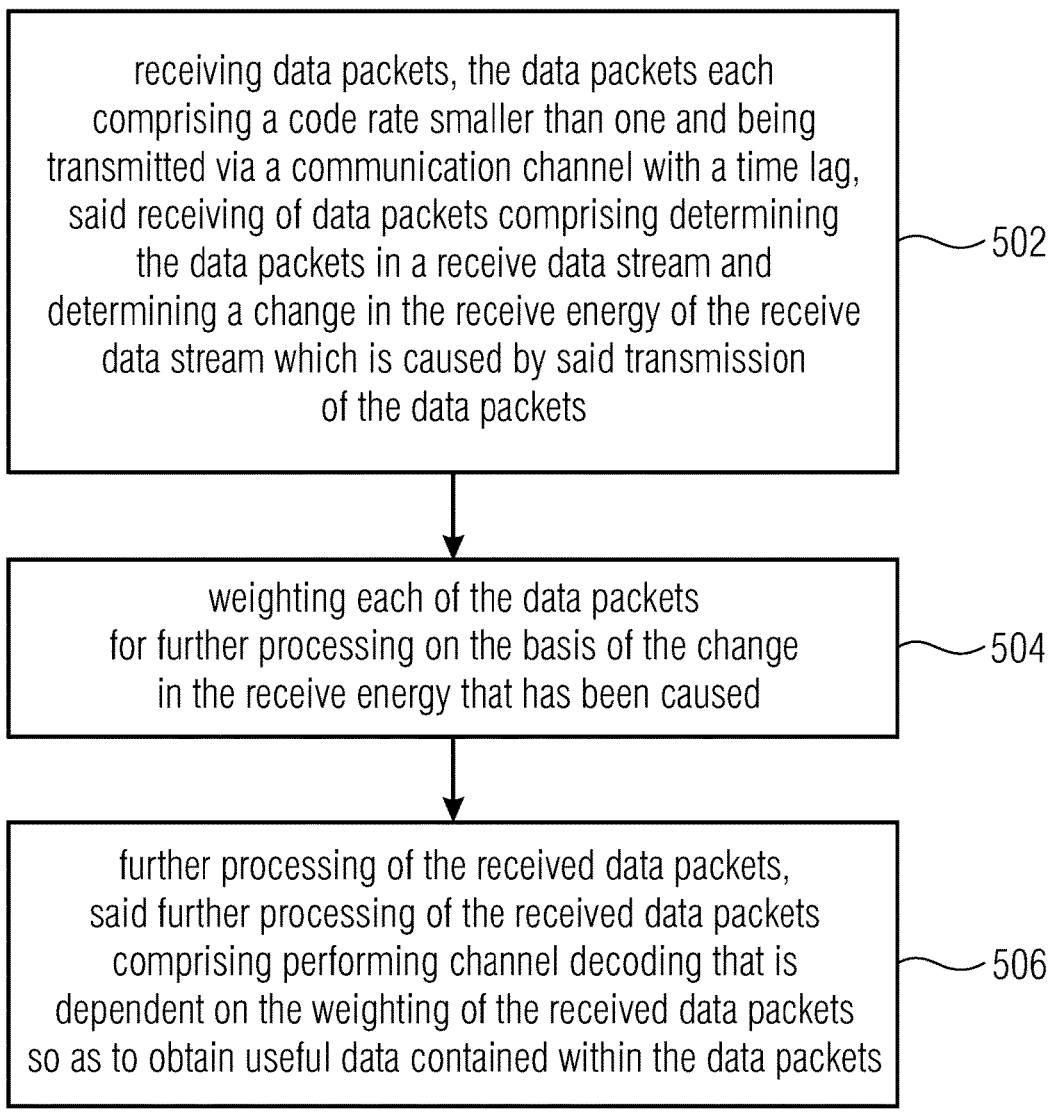
FIG. 7 shows a flow chart of a method of operating a data receiver, in accordance with an embodiment of the present invention.

FIG. 7 shows a flowchart of a method 500 of operating a data receiver 200. The method 500 includes receiving 502 data packets 112, the data packets 112 each having a code rate smaller than one and being transmitted via a communication channel with a time lag, said receiving 502 of data packets 112 comprising determining the data packets 112 within a receive data stream, comprises determining the data packets 112 within a receive data stream and determining a change in the receive power of the receive data stream which is caused in each case by the transmission of the data packets 112. Moreover, the method 500 includes weighting 504 each of the data packets for further processing on the basis of the change in the receive power which is caused so as to obtain received data packets. In addition, the method 500 includes further processing 506 the received data packets, wherein the further processing of the received data packets comprises channel decoding which is dependent on the weighting of the received data packets, so as to obtain useful data contained within the data packets.

Embodiments of the present invention allow adapting the transmission operation of a transmission arrangement 100 to the energy available in each case while restricting the transmission reliability to a small extent only. The data receiver 200 may synchronize this transmit signal by means of less computing power while accurately estimating the frequency offset.

Embodiments relate to a wireless method for data transmission arrangements (low-powered transmitters) 100 comprising energy harvesting, wherein the data to be transmitted is split up into small data packets (sub-packets) 112. In the event of insufficient energy supply, individual data packets 112 may be emitted with reduced power or not at all. The data receiver 200 recognizes when data packets 112 are missing or have been interfered with and will discard them so as to improve the result of the channel decoding.

Embodiments relate to a system 300 for transmitting small amounts of data from a large number of transmission arrangements (nodes) 100, e.g. sensor data such as data originating from heat, electricity or water meters, toward a data receiver (base station) 200. A data receiver (base station) 200 receives (and possible controls) a large number of transmission arrangements (nodes) 100. More computing power and, thus, a more complex hardware, i.e., generally, also a receiver 202 with increased performance capability, are available within the data receiver (base station) 200. Convenient quartzes, which in most cases have frequency offsets of 5 pp, 10 ppm or more, are used in the transmission arrangements (nodes) 100. Embodiments relate to the wireless transmission method which may also be transferred to other fields of application.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device), such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or actually cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device.

Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A data transmission arrangement comprising:
    an energy supplier for supplying the data transmission arrangement with electrical energy;
    a determiner for determining useful data provided by a sensor element connected to the data transmission arrangement;
    a coder for channel coding of the useful data so as to acquire channel-coded data;
    a splitter for splitting up the channel-coded data into a plurality of data packets comprising a code rate smaller than 1/1; and
    a transmitter for transmitting data packets which is configured to transmit the plurality of data packets via a communication channel with a temporal distance between the data packets, so that there are non-transmission periods in between the data packets during which no transmission is performed, provided that an amount of electrical energy that can be provided by the energy supplier is sufficient for transmitting the respective data packets at a standard transmitting power;

the energy supplier comprising an energy harvesting element for non-line-conducted energy extraction from the environment of the data transmission arrangement;

the energy supplier comprising an energy store for storing the energy extracted by the energy harvesting element, the energy store being configured for short, pulse-like load;

the transmitter for transmitting data packets being configured to select the temporal distance between the data packets with which the data packets are transmitted such that the energy store of the energy supplier is subjected to a short, pulse-like load;

the transmitter for transmitting data packets being configured to either transmit a data packet, which is about to be transmitted, of the plurality of data packets at a reduced transmitting power if an amount of electrical energy that can be provided by the energy supplier is sufficient for transmitting the respective data packet at the reduced transmitting power, the reduced transmitting power being reduced by a maximum of 40 dB as compared to the standard transmitting power; or not transmit or to transmit with delay a data packet, which is about to be transmitted, of the plurality of data packets if an amount of electrical energy that can be provided by the energy supplier is not sufficient for transmitting the respective data packet.

2. The data transmission arrangement as claimed in claim 1, wherein the energy harvesting element is configured to convert deformation energy, kinetic energy, thermal energy, electromagnetic energy or light energy to electrical energy in order to produce energy.

3. The data transmission arrangement as claimed in claim 1, the splitter for splitting up the channel-coded data being configured to provide at least two data packets of the plurality of data packets with a pilot sequence in each case for synchronizing the data packets in a data receiver, the splitter for splitting up the channel-coded data into a plurality of data packets being configured to vary an arrangement of the pilot sequences in the at least two data packets such that one data packet of the at least two data packets comprises an arrangement of the pilot sequence which deviates from the arrangement of the pilot sequence of another data packet of the at least two data packets.

4. The data transmission arrangement as claimed in claim 1, wherein the plurality of data packets each comprise a length of 20 symbols or less.

5. The data receiver as claimed in claim 4, wherein the receiver for receiving data packets is configured to determine, by means of the determined change in the receive power, whether or not a data packet has been transmitted; and/or wherein the receiver for receiving data packets is configured to determine, by means of the determined change in the receive power, whether or not a transmitted data packet has been superimposed by an interferer.

6. A system comprising:
a data transmission arrangement as claimed in claim 1; and
a data receiver comprising:
a receiver for receiving data packets, the data packets each comprising a code rate smaller than 1/1 and being transmitted via a communication channel with a temporal distance between the data packets, so that there are non-transmission periods in between the data packets during which no transmission is performed, the receiver for receiving data packets being configured to determine the data packets within a receive data stream;

the receiver for receiving data packets being configured to measure a receive power of the receive data stream during reception of the respective data packets and during the non-transmission periods prior to reception of the respective data packets and/or following reception of the respective data packets, so as to determine a change in the receive power of the receive data stream the receiver for receiving data packets being configured to weight, for further processing, each of the data packets on the basis of the determined change in the receive power so as to acquire received data packets;

processor for further processing the received data packets, configured to perform channel decoding of the received data packets which is dependent on the weighting of the received data packets, so as to acquire useful data comprised by the data packets.

7. A data receiver comprising:
a receiver for receiving data packets, the data packets each comprising a code rate smaller than 1/1 and being transmitted via a communication channel with a temporal distance between the data packets, so that there are non-transmission periods in between the data packets during which no transmission is performed, the receiver for receiving data packets being configured to determine the data packets within a receive data stream;

the receiver for receiving data packets being configured to measure a receive power of the receive data stream during reception of the respective data packets and during the non-transmission periods prior to reception of the respective data packets and/or following reception of the respective data packets, so as to determine a change in the receive power of the receive data stream;

the receiver for receiving data packets being configured to weight, for further processing, each of the data packets on the basis of the determined change in the receive power so as to acquire received data packets;

processor for further processing the received data packets, configured to perform channel decoding of the received data packets which is dependent on the weighting of the received data packets, so as to acquire useful data comprised by the data packets.

8. The data receiver as claimed in claim 7, wherein the processor for further processing of the received data packets is configured to take greater account, in the channel decoding, of data packets comprising a higher weighting than of data packets comprising a lower weighting.

9. The data receiver as claimed in claim 7, wherein the receiver for receiving data packets is configured to further process those data packets of the data packets as received data packets whose determined change in the receive power exceeds a threshold value selected such that the corresponding data packets are suitable for decoding; and wherein the receiver for receiving data packets is configured to discard those data packets of the data packets whose determined change in the receive power is smaller than or equal to the threshold value.

10. The data receiver as claimed in claim 7, wherein each of the data packets is provided with a pilot sequence for synchronizing the respective data packet within the data receiver, wherein the receiver for receiving data packets is configured to locate the data packets within the receive data stream on the basis of the pilot sequences so as to determine the data packets within the receive data stream.

11. The data receiver as claimed in claim 10, wherein the processor for further processing the received data packets is configured to adapt the weighting of the received data packets for channel decoding on the basis of the pilot sequences of the received data packets.

12. A method of operating a data transmission arrangement, the data transmission arrangement comprising an energy supplier for supplying the data transmission arrangement with electrical energy, the energy supplier comprising an energy harvesting element for non-line-conducted energy extraction from the environment of the data transmission arrangement, the energy supplier comprising an energy store for storing the energy extracted by the energy harvesting element, the energy store being configured for short, pulse-like load, the method comprising:
  determining useful data provided by a sensor element connected to the data transmission arrangement;
  channel coding of the useful data so as to acquire channel-coded data;
  splitting up the channel-coded data into a plurality of data packets comprising a code rate smaller than 1/1;
  transmitting the plurality of data packets via a communication channel with a temporal distance between the data packets, so that there are non-transmission periods in between the data packets during which no transmission is performed, provided that an amount of electrical energy that can be provided by the energy supplier is sufficient for transmitting the respective data packets at a standard transmitting power;
  said transmitting of the plurality of data packets comprising selecting the temporal distance between the data packets with which the data packets are transmitted such that the energy store of the energy supplier is subjected to a short, pulse-like load;
  said transmitting of the plurality of data packets comprising:
  transmitting a data packet, which is about to be transmitted, of the plurality of data packets at a reduced transmitting power if an amount of electrical energy that can be provided by the energy supplier is sufficient for transmitting the respective data packet at the reduced transmitting power, the reduced transmitting power being reduced by a maximum of 40 dB as compared to the standard transmitting power; or
  not transmitting or transmitting with delay a data packet, which is about to be transmitted, of the plurality of data packets if an amount of electrical energy that can be provided by the energy supplier is not sufficient for transmitting the respective data packet.

13. A method of operating a data receiver, comprising:
  receiving data packets, the data packets each comprising a code rate smaller than 1/1 and being transmitted via a communication channel with a temporal distance between the data packets, so that there are non-transmission periods in between the data packets during which no transmission is performed;
  said receiving of data packets comprising determining the data packets within a receive data stream;
  said receiving of data packets comprising measuring a receive power of the receive data stream during reception of the respective data packets and measuring a receive power of the receive data stream during the non-transmission periods prior to reception of the respective data packets and/or following reception of the respective data packets so as to determine a change in the receive power of the receive data stream;
  weighting each of the data packets for further processing on the basis of the determined change in the receive power so as to acquire received data packets;
  further processing the received data packets, wherein the further processing of the received data packets comprises channel decoding of the received data packets which is dependent on the weighting of the received data packets, so as to acquire useful data comprised by the data packets.

14. A non-transitory digital storage medium having a computer program stored thereon to perform the method of operating a data transmission arrangement, the data transmission arrangement comprising an energy supplier for supplying the data transmission arrangement with electrical energy, the energy supplier comprising an energy harvesting element for non-line-conducted energy extraction from the environment of the data transmission arrangement, the energy supplier comprising an energy store for storing the energy extracted by the energy harvesting element, the energy store being configured for short, pulse-like load, said method comprising:
  determining useful data provided by a sensor element connected to the data transmission arrangement;
  channel coding of the useful data so as to acquire channel-coded data;
  splitting up the channel-coded data into a plurality of data packets comprising a code rate smaller than 1/1;
  transmitting the plurality of data packets via a communication channel with a temporal distance between the data packets, so that there are non-transmission periods in between the data packets during which no transmission is performed, provided that an amount of electrical energy that can be provided by the energy supplier is sufficient for transmitting the respective data packets at a standard transmitting power;
  said transmitting of the plurality of data packets comprising selecting the temporal distance between the data packets with which the data packets are transmitted such that the energy store of the energy supplier is subjected to a short, pulse-like load;
  said transmitting of the plurality of data packets comprising:
  transmitting a data packet, which is about to be transmitted, of the plurality of data packets at a reduced transmitting power if an amount of electrical energy that can be provided by the energy supplier is sufficient for transmitting the respective data packet at the reduced transmitting power, the reduced transmitting power being reduced by a maximum of 40 dB as compared to the standard transmitting power; or
  not transmitting or transmitting with delay a data packet, which is about to be transmitted, of the plurality of data packets if an amount of electrical energy that can be provided by the energy supplier is not sufficient for transmitting the respective data packet,
  when said computer program is run by a computer.

15. A non-transitory digital storage medium having a computer program stored thereon to perform the method of operating a data receiver, said method comprising:
  receiving data packets, the data packets each comprising a code rate smaller than 1/1 and being transmitted via a communication channel with a temporal distance between the data packets, so that there are non-transmission periods in between the data packets during which no transmission is performed;
  said receiving of data packets comprising determining the data packets within a receive data stream;

said receiving of data packets comprising measuring a receive power of the receive data stream during reception of the respective data packets and measuring a receive power of the receive data stream during the non-transmission periods prior to reception of the respective data packets and/or following reception of the respective data packets so as to determine a change in the receive power of the receive data stream;

weighting each of the data packets for further processing on the basis of the determined change in the receive power so as to acquire received data packets;

further processing the received data packets, wherein the further processing of the received data packets comprises channel decoding of the received data packets which is dependent on the weighting of the received data packets, so as to acquire useful data comprised by the data packets, when said computer program is run by a computer.

16. A data transmission arrangement comprising:

a determiner for determining useful data provided by a sensor element connected to the data transmission arrangement;

a coder for channel coding of the useful data so as to acquire channel-coded data;

a splitter for splitting up the channel-coded data into a plurality of data packets comprising a code rate smaller than 1/1; and a transmitter for transmitting data packets which is configured to transmit the plurality of data packets via a communication channel with a temporal distance between the data packets, so that there are non-transmission periods in between the data packets during which no transmission is performed;

the splitter for splitting up the channel-coded data being configured to provide at least two data packets of the plurality of data packets with a pilot sequence in each case for synchronizing the data packets in a data receiver, the splitter for splitting up the channel-coded data into a plurality of data packets being configured to vary an arrangement of the pilot sequences in the at least two data packets such that one data packet of the at least two data packets comprises an arrangement of the pilot sequence which deviates from the arrangement of the pilot sequence of another data packet of the at least two data packets;

the splitter for splitting up the channel-coded data being configured to provide a first data packet of the at least two data packets with a pilot sequence arranged between the data comprised by the data packet; and the splitter for splitting up the channel-coded data being configured to provide a second data packet of the at least two data packets with a two-part pilot sequence and, a first part of the pilot sequence being arranged before the data comprised by the data packet and a second part of the pilot sequence being arranged after the data comprised by the data packet.

* * * * *